US005423381A

United States Patent [19]
Surles et al.

[11] Patent Number: 5,423,381
[45] Date of Patent: Jun. 13, 1995

[54] QUICK-SET FORMATION TREATING METHODS

[75] Inventors: Billy W. Surles; Philip D. Fader, both of Houston; Carlos W. Pardo, Sugar Land, all of Tex.

[73] Assignee: Texaco Inc., White Plains, N.Y.

[21] Appl. No.: 258,810

[22] Filed: Jun. 13, 1994

Related U.S. Application Data

[63] Continuation-in-part of Ser. No. 145,913, Oct. 29, 1993, abandoned.

[51] Int. Cl.$^6$ ............................................. E21B 33/138
[52] U.S. Cl. ....................................... 166/295; 166/300
[58] Field of Search ................ 166/295, 300; 523/130, 523/131

[56] References Cited

U.S. PATENT DOCUMENTS

| | | | |
|---|---|---|---|
| 4,034,811 | 7/1977 | Sparlin et al. | 166/295 |
| 4,427,069 | 1/1984 | Friedman | 166/295 |
| 4,662,449 | 5/1987 | Friedman | 166/295 |
| 4,669,543 | 6/1987 | Young | 166/276 |
| 4,800,960 | 1/1989 | Friedman et al. | 166/276 |
| 4,842,072 | 6/1989 | Friedman et al. | 166/295 |
| 4,903,770 | 2/1990 | Friedman et al. | 166/288 |
| 4,938,287 | 7/1990 | Friedman et al. | 166/288 |
| 5,005,647 | 4/1991 | Friedman et al. | 166/295 |
| 5,005,648 | 4/1991 | Friedman et al. | 166/295 |
| 5,010,953 | 4/1991 | Friedman et al. | 166/288 |
| 5,178,218 | 1/1993 | Dees | 166/295 X |
| 5,199,492 | 4/1993 | Surles et al. | 166/295 |
| 5,293,939 | 3/1994 | Surles et al. | 166/295 |

*Primary Examiner*—George A. Suchfield
*Attorney, Agent, or Firm*—James L. Bailey; Kenneth R. Priem; Harold J. Delhommer

[57] ABSTRACT

A method for fluid control or plugging of a well by injecting a mixture of an acid polymerizable resin, a polar organic diluent, and an acid catalyst, and later injecting an acidic fluid to quick-set a portion of the resin and hold it in place while the pre-mixed catalyst sets the resin. In an alternate sand consolidation embodiment, a fluid slug is injected between the resin and acidic fluid injections to create permeability in the resin saturated area of the formation prior to final set of the resin.

44 Claims, No Drawings

QUICK-SET FORMATION TREATING METHODS

BACKGROUND OF THE INVENTION

This is a continuation-in-part of U.S. patent application Ser. No. 08/145,913, filed Oct. 29, 1993, now abandoned.

p The invention concerns formation and well treating methods for the immediate vicinity of a wellbore. More particularly, the invention relates to the injection of a quick setting polymerizable resin premixed with an acid catalyst, followed by the injection of an acidic fluid to create a stable barrier around a wellbore that is impermeable to formation fluid flow for well plugging and fluid control purposes. In a third embodiment for sand consolidation, a fluid slug is injected to create permeability in the resin material prior to acidic fluid injection.

Formation treating methods for purposes of sand consolidation, fluid control, and well plugging for abandonment are well-known procedures practiced with numerous variations in the oil field. When wells are completed in underground hydrocarbon formations which contain unconsolidated granular material such as sand or gravel, production of fluids from the formation causes the flow of the particulate matter into the wellbore. This often leads to one or more difficult and expensive problems which can be solved by the present invention. Sometimes a well will "sand up," meaning the lower portion of the wellbore becomes filled with sand, rendering further fluid production difficult or impossible. Sand production along with fluid will also result in passage of the sand into the pump and associated hardware of the producing well, causing accelerated wear of components. Sustained sand production may also form a cavity in the formation in the near vicinity of the wellbore, which may collapse and destroy the well.

Another problem encountered in oil production to which the present process offers an attractive solution is encountered when a well is in fluid communication with a zone that includes one or more oil producing intervals and one or more water producing intervals. The present invention allows creation of a fluid impermeable barrier around the well in the water producing intervals to reduce or eliminate the flow of water from the formation into the well.

In yet another embodiment, the resin/catalyst mixture can be used to completely plug a well which is to be abandoned. This embodiment requires a slightly greater volume of resin-catalyst mixture to be used, since the best results for this embodiment require that the interior of the well casing and/or tubing be filled completely with the resin for all or a substantial amount of its length. The long term durability of the material used to plug wells for abandonment is of high current interest because of the danger that salt water or petroleum might enter and contaminate fresh water aquifers.

Sand production has been the subject of extensive research by the petroleum industry to minimize or eliminate the production of sand particles into the producing well. One general approach has been to consolidate the poor sand structure around the wellbore, to form a permeable mass which will allow production of fluids but restrain the movement of sand into the wellbore. The objective is to create a permeable barrier or sieve adjacent the perforations. A second approach has been to remove a portion of the formation around the well and pack specially prepared granular material into the formation which is cemented together.

Most prior art solutions have had difficulty with the durability of the permeable barrier formed around the wellbore. Once the barrier is formed and the well is placed on production, there will be a substantial flow of fluids through the barrier abrading and deteriorating the consolidated matrix. Durability is a particularly difficult objective to achieve in formations subjected to the high temperatures of steamflooding, or high and low pH treatment fluids. The high temperatures and high pH of steamflooding fluids greatly decrease the durability of most consolidation methods.

It is also important that the injected material be essentially unreactive while it is inside the wellbore prior to entering the formation. One does not desire cementitious material to set up in the wellbore. This has lead to multi-step procedures in the prior art in which a catalyst and polymerizable resin are injected in separate steps. A separate step injection process yields inherent weaknesses in many prior art methods of sand consolidation. First, each separate injection step increases the time and cost associated with the well treatment. Second, injection in separate steps makes uniform mixing of catalyst and resin difficult, which is essential for the strength and durability of the consolidated mass. Third, use of aqueous fluids to inject a catalyst or resin often creates the need for an additional time consuming step to first clean the sand to remove hydrocarbons for better consolidation.

One of the more successful agents used for sand consolidation has been a furfuryl alcohol resin, which can be polymerized to form a solid mass with sand, and is durable in the presence of high temperatures and caustic substances. One problem in using a furfuryl alcohol resin is accomplishing uniform catalysis of the polymerization. Most effective catalysts for this polymerization cannot be admixed with the furfuryl alcohol to permit injection of a single fluid, because the polymerization time is too short or unpredictable. Thus, U.S. Pat. No. 4,427,069 disclosed a multistep process for consolidating sand adjacent to a wellbore with an acidic salt catalyst such as zirconyl chloride injected separately from the furfuryl alcohol oligomer.

U.S. Pat. No. 4,669,543 described a sand consolidation method using an acid curable resin in the dispersed or discontinuous phase of an emulsion, and a catalyst incorporated in an aqueous carrier fluid which comprised the continuous phase of the emulsion. The emulsion was broken after placement in the area of the formation desired to be consolidated. As in a multistep injection process, the breaking of the emulsion at the proper location as well as sufficient mixing of catalyst and resin is a difficult goal to accomplish.

The pre-injection coating of gravel with a similar resin system is disclosed in U.S. Pat. No. 4,800,960. The resin system is preferably the furfuryl alcohol oligomer with ester and catalyst suspended in a carrier fluid and set by heat or pressure in the formation.

U.S. Pat. No. 4,842,072 teaches the injection of a polymerizable resin such as a furfuryl alcohol oligomer with an oil soluble nitrobenzoic acid catalyst and polar organic diluent such as butyl acetate. After injection of the resin/catalyst fluid into the adjacent formation, an aqueous saline solution which is 70% to 100% saturated with inorganic salt is injected into the resin saturated area of the formation to open flow channels through the formation into which the resin/catalyst fluid was injected. Although this sand consolidation solution works fine under most conditions, it takes too long to set-up or consolidate in low temperature formations under 250° F. Not only does a long set-up time create problems in terms of the costs of the workover crew and lost production, a high pressure formation may make it difficult or impossible for the resin to harden between the sand grains prior to being blown out of the formation. Thus, for high pressure, low temperature formations a quick setting resin/catalyst mixture is essential. And for all formations, a quick setting resin/catalyst mixture is desirable in terms of time saved.

In U.S. Patent 4,903,770, there is disclosed an inexpensive process, wherein the polymer is more easily removed after use. It process employs a fluid comprising a polymerizable monomer such as furfuryl alcohol, a polar organic solvent such as methanol, and a strong, non-volatile acid catalyst such as sulfuric acid, mixed with steam to form a multiphase or aerosol treating fluid, all of which is injected into the formation to be consolidated. An ester such as ethyl or butyl acetate is incorporated in the fluid when the steam quality is less than 80%.

U.S. Pat. No. 5,199,492 discloses a preflush of an organic solvent, preferably an ester such as butyl acetate, followed by the injection of a multiphase or aerosol treating fluid formed with a polymerizable oligomer, an ester, an acid catalyst, and a noncondensable gas. The well is shut in for a sufficient period of time to set a permeable barrier.

A system similar to U.S. Pat. No. 4,842,072 is disclosed in U.S. Pat. No. 5,005,648 to plug a particular zone of a formation without having paths for fluid flow. The reference discloses the injection of a furfuryl alcohol/acid catalyst/butyl acetate mixture into the formation without a subsequent brine injection step. Nitrobenzoic acid is disclosed as a preferred acid catalyst for formation temperatures greater than 250° F., while toluene sulfonic acid is disclosed as the preferred catalyst for temperatures less than about 250° F. U.S. Pat. No. 5,005,647 discloses a similar process for shutting off specific zones of flow.

U.S. Pat. No. 5,010,953 teaches a sand consolidation process using a polymerizable compound such as furfuryl alcohol, a diluent such as a low molecular weight alcohol, an acid catalyst, an ester, and as an additive to reduce shrinkage, a copolymer of starch and a synthetic polymer such as acrylamide or acrylate.

U.S. Pat. No. 4,938,287 describes a process in which a preflush such as ethyl or butyl acetate is injected into the sand to be consolidated to remove oily residue, followed by injecting the treating fluid containing the polymerizable resin, diluent, ester and acid catalyst to accomplish sand consolidation.

In U.S. Pat. No. 5,285,849, a formation treating method is disclosed using a fluid containing a polymerizable resin such as furfuryl alcohol, an acid, catalyst such as toluene sulfonic acid or o-nitrobenzoic acid, and an ester is disclosed. The acid and acid concentration are selected to result in a polymerization set time of 1-24 hours.

Another furfuryl alcohol treating method is disclosed in U.S. Pat. No. 5,293,939, wherein the resin/catalyst fluid includes a solvent with a greater density than the resin. Further, U.S. application Ser. No. 08/064,313, filed May 20, 1993, now U.S. Pat. No. 5,377,759, discloses a furfuryl alcohol treating method, wherein the resin/catalyst fluid contains two different acid catalysts having specified properties.

SUMMARY OF THE INVENTION

The invention is a method for treating an area of an underground hydrocarbon formation adjacent to a wellbore, comprising in one embodiment a two-step injection process followed by a shutting in of the wellbore to form a consolidated mass around the wellbore for fluid control. This method may be augmented by more resin material with or without aggregate to plug and abandon a wellbore.

A resin fluid is first injected into the formation adjacent to the wellbore to saturate at least a portion of the formation. The resin fluid comprises an acid polymerizable resin, a polar organic diluent for the resin, and an acid catalyst capable of polymerizing the resin at formation temperatures. Second, an aqueous acidic fluid is injected into the same portion of the formation contacted by the resin fluid. Although the acidic fluid may be substantially salt-free, preferably it comprises inorganic salts in a concentration of at least 70% of saturation of said inorganic salts at surface ambient temperature. Finally, the wellbore is shut in for a period of time sufficient to accomplish at least partial polymerization of the resin, to form a consolidated mass around the wellbore.

In a second embodiment, the invention method is improved if a small volume fluid spacer slug is injected between the resin and acidic fluids to clear resin fluid out of the injection components prior to acidic fluid injection to prevent the resin from hardening within the injection components such as tubulars. However, this is not necessary if the well is being plugged and abandoned, and the acidic fluid is able to exit the tubulars and contact resin fluid in the formation. But care must be taken not to inject too large a fluid volume as to create communication paths between the formation and wellbore prior to acidic fluid contact with the resin.

A third embodiment of sand consolidation (which requires permeability) further comprises the additional step of injecting a fluid into the same portion of the formation contacted by the resin fluid in sufficient volume to establish communication between the formation and the wellbore in the resin fluid saturated portion of the formation between the resin and acidic fluids. As in the second embodiment, the fluid may be any type of fluid which does not substantially react with the resin fluid. Preferably, the fluid comprises a brine having inorganic salts in a concentration of at least 70% of saturation concentration of those salts.

DETAILED DESCRIPTION

The invention is a formation treating method for decreasing the set time of a furfuryl alcohol oligomer/acid catalyst system to form a permeable or impermeable, yet consolidated mass such as disclosed in U.S. Pat. Nos. 4,842,072 and 5,005,648, the disclosures of which are incorporated herein by reference. By injecting an aqueous acidic fluid into polymerizing resin and sand, the polymerization reaction is quickened and the consolidated matrix set substantially sooner. Although the invention may be employed with either high or low temperature formations to treat formations, it has particular application with low temperature formations, which produce longer set times for the furfuryl alcohol/catalyst mixture. Most particularly, the invention has application in low temperature, high pressure formations where a quick set time is crucial.

Although the acidic fluid injection only sets the small portion of the resin that it contacts, this is enough to hold the resin/diluent/catalyst mixture in place so that it is not washed away by incoming fluid. Enough resin is quick-set to permit the large remainder of the resin to be strongly set by the internal catalyst. The combination procedure of the invention permits the use of substantially less resin. For example, we often use 5 gallons of resin/foot of treated formation, whereas it is common for prior art methods with an acidic postflush to use 50 gallons of resin/foot, or ten times as much resin.

The invention method for well treating comprises at least two injection steps for the plugging embodiment, and at least three injection steps for the fluid shutoff and sand consolidation embodiments. The first step is to inject a resin fluid into the formation adjacent to the wellbore to saturate at least a portion of the formation around the wellbore. The fluid comprises polymerizable resin, a polar organic diluent for the resin, and an acid catalyst capable of polymerizing the resin at formation temperatures. Second, an aqueous acidic fluid is injected into the same portion of the formation as the resin fluid. Although the acidic fluid may be substantially salt-free, preferably it is a brine comprising inorganic salts in a concentration of at least 70% of saturation of said inorganic salts at surface ambient temperature. The use of an acidic brine is preferred as a brine keeps the polymerizing resin from swelling and sweeps out fresh water, which may cause swelling.

Finally, the wellbore is shut in for a period of time sufficient to accomplish at least partial polymerization of the resin, forming an impermeable consolidated mass around the wellbore particularly effective for fluid shutoff or plugging a well for abandonment. It is a feature of the invention that a preliminary wash step to remove materials coating sand grains is not required due to the polar organic diluent employed in the resin fluid.

In the second embodiment of fluid shutoff, a relatively small volume fluid spacer slug, preferably aqueous fluid, most preferably brine, is injected between the resin and acidic fluids to clear resin fluid out of the injection components such as tubulars. Otherwise, the tubular goods may be rendered unusable for future operations. But the fluid spacer slug must not be any larger than necessary to clear resin fluid out or it may have the unintended and undesirable consequence of creating communication paths through the resin saturated formation zone.

Because the chief purpose of the fluid spacer slug is to clear resin fluid out of the injection components, the type of fluid used in this slug is not critical as long as the fluid does not substantially react with the resin fluid. Cost and availability in the oil field is also a consideration. Thus, fluids which have traditionally been used in the oil field for flushing or spacing, such as diesel or a gelled aqueous solution, may be used, although a brine is the most preferred fluid.

In the third embodiment of sand consolidation, a permeable resin/formation zone is desired with communication paths between the formation and wellbore. To accomplish this goal, a fluid slug is injected between the resin and acidic slugs in sufficient volume to create communication paths between the wellbore and the formation through the resin saturated formation zone as the fluid escapes into the formation. The later injected acidic fluid helps to harden these communication paths as well as the entire mass of resin in the formation. The acidic fluid injection step will quickly yield a permeable consolidated mass around the wellbore, which permits fluid flow, but is highly resistant to chemical and thermal degradation.

As in the second embodiment, the fluid slug is preferably an aqueous fluid, most preferably brine, due to the brine ability to sweep out fresh water and prevent polymer swelling. Because the chief purpose of this fluid slug is to create communication paths through the resin/formation zones, the type of fluid used in this slug is not critical as long as the fluid does not substantially react with the resin fluid. Cost and availability in the oil field is also a consideration. Thus, fluids which have traditionally been used in the oil field for flushing or spacing, such as diesel or a gelled aqueous solution, may be used, although a brine is the most preferred fluid.

For any of the embodiments, a preflush fluid may optionally be injected into the formation area to be contacted by the invention method for various purposes such as cleaning up the near wellbore area, conditioning the formation matrix, etc. But this is not necessary.

The polymerizable resin must be a substance which is catalyzed by the presence of an acidic material to polymerize into a rigid solid mass to occupy the pore spaces of the formation in which it is introduced. The preferred polymerizable material is an oligomer of furfuryl alcohol $(C_4H_3OCHO)_n$. This resin has the advantages of low cost and autopolymerization on exposure to acid catalyst, forming a thermal-setting resin which cures to an insoluble mass. One particularly preferred commercially available furfuryl alcohol oligomer is sold under the trademark "QUACORR® 1300" by Q. O. Chemicals, Inc. This resin is usually obtained commercially in a 90%–95% oligomer emulsion.

The acid catalyst employed may vary substantially. Although the preferred furfuryl alcohol oligomer may be catalyzed by almost any acid, most acids are too strong a catalyst for the invention method in that they cause polymerization to occur almost instantly. Such quick polymerization prevents the premixing of the resin and the catalyst as well as injection into the formation. The catalyst used in the resin fluid is preferably one which exhibits temperature sensitivity such that catalytic polymerization does not occur during the time the fluid is prepared and mixed on the surface or pumped into the formation. Polymerization is then catalyzed by the elevated temperature of the formation and the subsequent injection step of the acidic fluid.

It is desirable to use a weak acid catalyst to produce a slow polymerization reaction, which will be sped up by the higher formation temperatures after injection as disclosed in U.S. Pat. No. 4,842,072. But at relatively low formation temperatures below about 250° F., and particularly below 200° F., polymerization occurs too slowly for practical benefit. Consequently, the invention method must employ a weak acid catalyst such as using the prior acid to begin polymerization, and quickly finish the polymerization reaction with a stronger acid catalyst (acidic fluid) once the resin is in place in the formation.

The preferred weak acid catalysts for mixing into the resin fluid slug are aryl sulfonic acids for formation temperatures under about 250° F. and nitrobenzoic acid, most preferably ortho-nitrobenzoic acid, for formation temperatures over 250° F. The aryl sulfonic acid is preferably xylene sulfonic acid or benzene sulfonic acid, and most preferably, toluene sulfonic acid. These catalysts should be used in a concentration range of about 0.7% to about 4% by volume, preferably about 0.7% to about 1.2% by volume. It must be remembered that the concentration and choice of the acid catalyst will determine the set time, which is important in achieving the proper depth and uniformity of invasion of the interval being treated with the fluid.

The melting points of the acid catalysts may be above surface ambient temperatures. For example, the melting point of toluene sulfonic acid is 223° F., so it is usually necessary to add the catalyst to the diluent. It may also be incorporated in another organic diluent such as methanol prior to addition to the diluent.

A second major component of the resin fluid is a polar organic diluent, preferably an ester, most preferably ethyl acetate or butyl acetate. Since the oligomer and diluent are organic, the minor amounts of formation petroleum and other materials coating and contaminating the surface of the sand grains are effectively removed or dissolved. This distinguishes the invention from other prior art methods in that a preliminary wash step to remove materials coating the sand grains is not required. The organic diluent is also required because the furfuryl alcohol oligomer emulsion is normally so viscous that it must be diluted with an appropriate solvent in order to be pumped into the formation and to fill void spaces between the sand grains.

Although most organic solvents for the furfuryl alcohol oligomer would accomplish the objective, the use of an ester is preferred. The polymerization of furfuryl alcohol oligomer is a condensation reaction which produces water, suppressing the polymerization reaction. The use of a hydrolyzable ester removes the water produced during the condensation polymerization and forces the polymerization reaction further toward completion, producing longer polymer chains than would result if water were left in the polymer reaction mass. This yields a stronger, more durable polymer matrix to bind the sand grains together. Accordingly, our preferred polar organic diluent for the furfuryl alcohol oligomer preferred embodiment is a hydrolyzable ester, and the especially preferred ester is butyl acetate. Other possible esters are methyl acetate, ethyl acetate, and propyl acetate.

The resin fluid is mixed wherein the concentration of the furfuryl alcohol oligomer is from about 39% to about 89% by volume of the total volume and the ester is about 10% to about 60% by volume. In a high pressure formation, it may be desirable to have a higher concentration of the oligomer to give a more viscous resin fluid to aid in positioning the fluid in the formation. Thus, the preferred concentrations for the more viscous resin fluid are about 59% to about 84% furfuryl oligomer by volume and about 15% to about 40% ester by volume.

The volume of resin fluid injected must be enough to treat the formation for at least 1 inch to 2 inches into the formation from the wellbore, and preferably, at least 6 inches into the formation from the wellbore. In the well plugging embodiment, it may be desirable to estimate for a minimum penetration of at least 12 inches into the formation. As a general guideline, a volume of fluid equal to two times the volume required to fill the tubing in the perforated interval to be treated may be employed for the fluid shutoff or sand consolidation embodiments.

Of course, the quantity of injected fluid will vary depending on the thickness and porosity of the formation to which the process is to be applied, as well as the diameter of the well and the desired thickness of the permeable barrier in the formation. If it is desired to treat a formation whose thickness is 18 feet with a porosity of 35% to form an 8 inch thick permeable barrier just outside the perforations of a 10 inch diameter wellbore, then the volume of fluid necessary is calculated according to the example below. Volume of fluid in cubic feet equals:

$$\frac{\pi(10/2 + 8)^2 - \pi(10/2)^2}{144} \text{(Height) (Porosity)}$$

$$\frac{3.14(13)^2 - 3.14(5)^2}{144} (18)(.35) = 19.79 \text{ ft}^3$$

or 148 gallons of fluid.

The selection of acid in the acidic fluid injection step is not critical. Most acids, except for weak acids, will very quickly polymerize the furfuryl resin. Because of low cost and easy availability, an aqueous fluid containing hydrochloric acid is preferred, preferably between about 10% and about 28% concentrated hydrochloric acid.

Although a substantially salt-free solution may be used in this acidic injection step, the resin may yield a weaker set. This is because fresh water or water containing up to 70% salt does not accomplish the dewatering action desired to strengthen and minimize swelling of the polymerized resin. Thus, the acidic slug preferably is at least 70% saturated with respect to inorganic salts, and preferably 80% to 100% saturated.

Various salts such as sodium chloride, potassium chloride, calcium chloride and others may be used. Although potassium chloride may be used, it is not preferred as a surfactant may also be required to prevent complications with the resin reaction. As a practical matter, the preferred brine used will probably contain sodium chloride because of cost and availability.

It is sufficient if the volume of acidic fluid injected is about the same volume as the resin fluid employed. But preferably, the volume of acidic fluid will be greater.

The last step is shutting in the wellbore for a period of time sufficient to accomplish at least partial polymerization of the resin, to form a consolidated mass around the wellbore. Such a mass will be permeable in the sand consolidation embodiment. The shutting in period of the wellbore should be for at least 1 hour to about 2 days, more preferably about 1 to about 8 hours. The time required for the polymerization reaction to proceed to completion is a function of temperature, and a longer shut in time may be required at lower temperatures if the acid employed in the aqueous acidic fluid is a weak or low concentration acid. Of course, the use of a stronger acid or higher concentration in the aqueous acidic fluid should result in solid masses within 1 to 2 hours.

After the injection of the resin fluid, the resin fluid should be displaced from the injection string in most cases to avoid the possibility that it might polymerize in the wellbore. As a practical matter, a fluid spacer slug may not be totally effective at displacing set polymer from the inside of the injection string or wellbore. It may be desirable to drill out any residual polymer before placing the well back on production for the fluid control and sand consolidation embodiments.

For sand consolidation purposes, the resin fluid injection into the formation occupies essentially all of the void space of the formation. If the injected fluid polymerized, the barrier would be insufficiently permeable to permit flow of formation fluids into the wellbore. Thus, a second injection step is required of a fluid slug to clear the resin fluid from the wellbore and remove some of the resin fluid from the void spaces in the formation to create channels for production fluids to later flow into the wellbore. This is done by injecting a fluid slug into the same portion of the formation contacted by the resin fluid, said fluid preferably comprising inorganic salts in a concentration of at least 70% by saturation of said inorganic salt at surface ambient temperature. The injection of such a slug also aids in dewatering the resin fluid to some degree. As noted earlier, any fluid which will not significantly react with the resin may be used, such as diesel.

The resin fluid and the aqueous acid fluid must be physically separated from each other until the time and location of polymerization is reached. The easiest and safest way to keep the fluids from contacting each other in the tubulars in the wellbore is to have a spacer fluid, such as the fluid slug between the resin fluid and the aqueous acidic fluid. If the spacer fluid was omitted, the aqueous acidic fluid would cause the resin to set so fast that holes in the consolidated mass would not be created, and the mass would not be permeable. Other ways to physically separate the resin fluid and aqueous acidic fluid include separate tubing strings and the use of a wiper plug.

In some sand consolidation cases, it may be desirable to drill out the wellbore after treatment for a distance from 10 to 50 feet below the lowest production level to create a void (called a rat hole in the field) into which sand and other solids can fall and accumulate and thereby delay the time when it will become necessary to suspend oil production and bail out the well.

The following example will further illustrate the novel methods of the present invention for well treating. This example is given by way of illustration and not as limitations on the scope of the invention. Thus, it should be understood that the composition and method steps of well treating may be varied to achieve similar results within the scope of the invention.

EXAMPLE 1

A six inch cell was packed with sand and flushed with water. 300 ml of resin fluid was pumped in the cell. The resin fluid consisted of an 80/20 mixture of "QUACORR ® 1300" /butyl acetate and a 1% by volume of toluene sulfonic acid. As noted, "QUACORR ® 1300" is a furfuryl alcohol oligomer.

A 100 ml saturated slug of sodium chloride brine was pumped into the cell, and followed with a 900 ml aqueous acidic fluid fully saturated with sodium chloride. The aqueous acidic fluid contained 15% concentrated hydrochloric acid by volume.

The cell was placed in an oven for 2 hours at 140° F. The result was a completely consolidated permeable sand pack.

Many other variations and modifications may be made in the concepts described above by those skilled in the art without departing from the concept of the present invention. Accordingly, it should be clearly understood that the concepts disclosed in the description are illustrative only and are not intended as limitations on the scope of the invention.

What is claimed is:

1. A method for quickly consolidating mineral particles including sand in an underground hydrocarbon formation penetrated by a wellbore in fluid communication with at least a portion of the formation, comprising:
   (a) injecting a resin fluid into the formation adjacent to a wellbore to saturate at least a portion of the formation, said fluid comprising a polymerizable resin, a polar organic diluent for the resin, and an acid catalyst capable of causing polymerization of the resin at formation temperatures;
   (b) injecting an aqueous acidic fluid into the same portion of the formation contacted by the resin fluid; and
   (c) shutting in the wellbore for a period of time sufficient to accomplish at least partial polymerization of the resin, forming a consolidated mass around the wellbore.

2. The method of claim 1, further comprising filling the wellbore with resin fluid after forming a consolidated mass around the wellbore.

3. The method of claim 2, wherein the resin fluid for filling the wellbore further comprises an aggregate.

4. The method of claim 1, further comprising injecting a fluid spacer slug to clear resin fluid out of injection components prior to injection of the acidic fluid.

5. The method of claim 1, wherein the resin is oligomer of furfuryl alcohol.

6. The method of claim 5, wherein the concentration of the furfuryl alcohol oligomer is from about 39% to about 89% by volume based on the total volume of the resin fluid.

7. The method of claim 1, wherein the acidic fluid comprises about 10% to about 28% by volume of hydrochloric acid.

8. The method of claim 1, wherein the polar organic diluent is a hydrolyzable ester.

9. The method of claim 1, wherein the concentration of polar organic diluent in the resin fluid is from about 10% to about 60% by volume.

10. The method of claim 1, wherein the concentration of catalyst is from about 0.7% to about 4% by volume.

11. The method of claim 1, wherein the acidic fluid further comprises inorganic salts, and is at least 70% saturated with respect to those inorganic salts at surface ambient temperatures.

12. The method of claim 11, wherein the inorganic salts are predominantly sodium chloride.

13. The method of claim 1, wherein the volume of resin fluid injected into the formation is sufficient to saturate the pore space of the formation adjacent to the wellbore for a distance up to about 12 inches from the wellbore.

14. The method of claim 1, wherein the volume of resin fluid injected into the formation is sufficient to saturate the pore space of the formation adjacent to the wellbore for a distance up to 6 inches from the wellbore.

15. The method of claim 1, wherein the wellbore is shut in for a period of about 1 hour to about 2 days.

16. The method of claim 1, wherein the acid catalyst is nitrobenzoic acid, or an aryl sulfonic acid.

17. The method of claim 16, wherein the aryl sulfonic acid is toluene sulfonic acid, xylene sulfonic acid or benzene sulfonic acid.

18. The method of claim 1, further comprising the additional step of injecting a fluid slug into the same portion of the formation contacted by the resin fluid in sufficient volume to establish communication between the formation and the wellbore in the resin fluid saturated portion of the formation after the injection of the resin fluid and before the aqueous acidic fluid.

19. The method of claim 18, wherein said fluid slug comprises diesel.

20. The method of claim 18, wherein said fluid slug is a brine comprising inorganic salts in a concentration of at least 70% of saturation of said inorganic salts at surface ambient temperatures.

21. The method of claim 20, wherein the brine is at least 80% saturated with respect to said inorganic salts.

22. The method of claim 20, wherein the brine is a saturated sodium chloride brine.

23. The method of claim 18, wherein the concentration of catalyst is from about 0.7% to about 4% by volume.

24. The method of claim 18, wherein the concentration of catalyst is from about 0.7% to about 1.2% by volume.

25. The method of claim 18, wherein the acidic catalyst is an aryl sulfonic acid or nitrobenzoic acid.

26. The method of claim 23, wherein the aryl sulfonic acid is toluene sulfonic acid, xylene sulfonic acid or benzene sulfonic acid.

27. The method of claim 18, wherein the resin fluid is prepared by dissolving catalyst in the polar organic diluent and then mixing with the resin.

28. The method of claim 18, wherein the volume of said fluid slug is about 25% to about 75% of the volume of injected resin fluid.

29. The method of claim 18, wherein the resin is an oligomer of furfuryl alcohol.

30. The method of claim 18, wherein the concentration of the furfuryl alcohol oligomer is from about 39% to about 89% by volume based on total volume of the resin fluid.

31. The method of claim 18, wherein the concentration of the furfuryl alcohol oligomer is from about 59% to about 84% by volume.

32. The method of claim 18, wherein the aqueous acidic fluid comprises about 10% to about 28% by volume of hydrochloric acid.

33. The method of claim 18, wherein the concentration of polar organic diluent in the resin fluid is from about 10% to about 60% by volume.

34. The method of claim 18, wherein the concentration of polar organic diluent in the resin fluid is from about 15% to about 40% by volume.

35. The method of claim 18, wherein the polar organic diluent is a hydrolyzable ester.

36. The method of claim 35, wherein the polar organic diluent is butyl acetate.

37. The method of claim 18, wherein the acidic fluid further comprises inorganic salts in a concentration of at least 70% of saturation of said inorganic salts at surface ambient temperature.

38. The method of claim 37, wherein the inorganic salts are predominantly sodium chloride.

39. The method of claim 18, wherein the volume of resin fluid injected into the formation is sufficient to saturate the pore space of the formation adjacent the wellbore for a distance of up to 6 inches from the wellbore.

40. The method of claim 18, wherein the volume of acidic fluid injected into the formation is at least as great as the volume of resin fluid used.

41. The method of claim 18, wherein the wellbore is shut in for a period of about 1 hour to about 2 days.

42. The method of claim 18, wherein the wellbore is shut in for a period of about one to about 8 hours.

43. A method for quickly consolidating mineral particles including sand in an underground hydrocarbon formation penetrated by a wellbore in fluid communication with at least a portion of the formation, comprising:

(a) injecting a resin fluid into the formation adjacent to a wellbore to saturate at least a portion of the formation, said fluid comprising about 59% to about 84% by volume of an oligomer of furfuryl alcohol, about 15% to about 40% by volume of butyl acetate, and about 0.7% to about 1.2% by volume of toluene sulfonic acid for catalyzing polymerization of the oligomer at formation temperatures;

(b) injecting a brine into the same portion of the formation contacted by the resin fluid in sufficient volume to establish communication between the formation and the wellbore in the resin fluid saturated portion of the formation after the injection of the resin fluid and before the aqueous acidic fluid, said brine comprising saturated sodium chloride;

(c) injecting an aqueous acidic fluid into said portion of the formation, said acidic fluid comprising saturated sodium chloride and about 10 vol % to about 28 vol % hydrochloric acid; and (d) shutting in the wellbore for about one to about 8 hours to accomplish at least partial polymerization of the oligomer, forming a permeable consolidated mass around the wellbore.

44. A method for quickly consolidating mineral particles including sand in an underground hydrocarbon formation penetrated by a wellbore in fluid communication with at least a portion of the formation, comprising:

(a) injecting a resin fluid into the formation adjacent to a wellbore to saturate at least a portion of the formation, said fluid comprising about 59% to about 84% by volume of an oligomer of furfuryl alcohol, about 15% to about 40% by volume of butyl acetate, and about 0.7% to about 1.2% by volume of toluene sulfonic acid for catalyzing polymerization of the oligomer at formation temperatures;

(b) injecting an aqueous spacer slug to clear resin fluid out of injection components;

(c) injecting an aqueous acidic fluid into said portion of the formation, said acidic fluid comprising saturated sodium chloride and about 10 vol % to about 28 vol % hydrochloric acid; and (d) shutting in the wellbore for about one to about 8 hours to accomplish at least partial polymerization of the oligomer, forming an impermeable consolidated mass around the wellbore.

* * * * *